April 9, 1935.  M. PARIDON  1,997,390
LEVEL CONTROLLING MEANS FOR LIQUID CONTAINING VESSELS
Filed Aug. 31, 1932  2 Sheets-Sheet 1
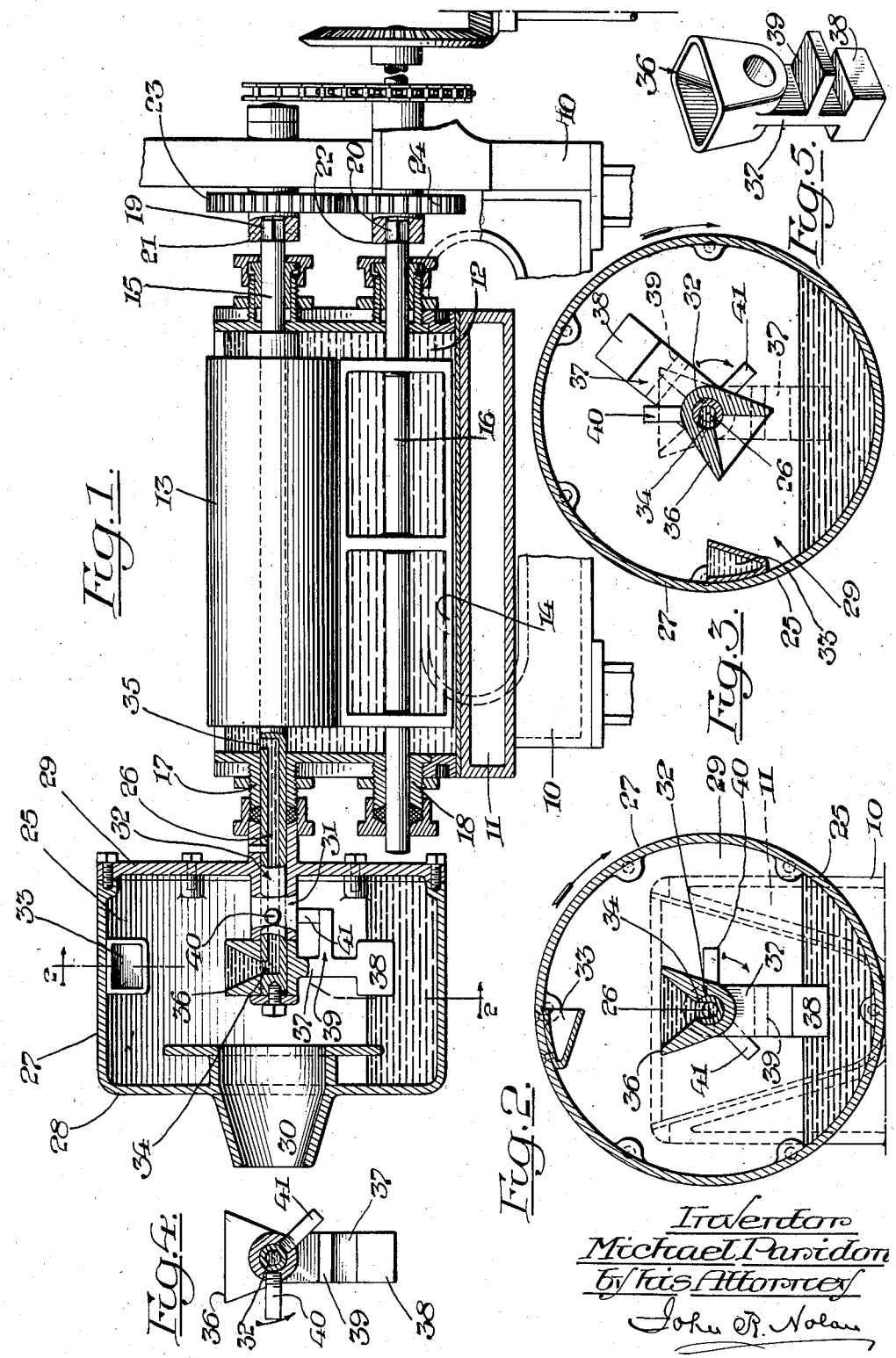
Inventor
Michael Paridon
by his Attorney
John R. Nolan

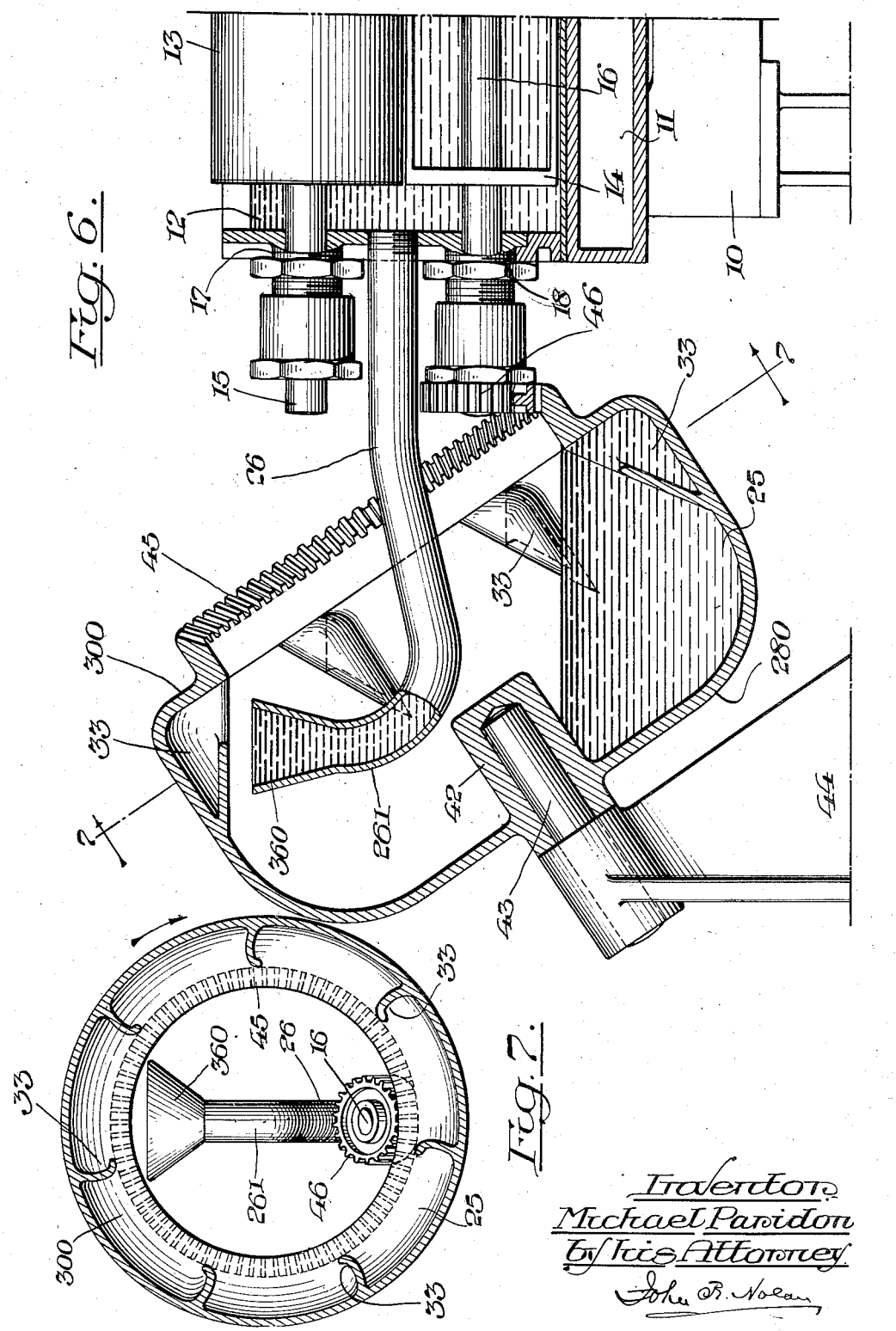

Patented Apr. 9, 1935

1,997,390

UNITED STATES PATENT OFFICE 1,997,390

LEVEL CONTROLLING MEANS FOR LIQUID CONTAINING VESSELS

Michael Paridon, Barberton, Ohio, assignor to The Diamond Match Company, Baltimore, Md., a corporation of Maryland Application August 31, 1932, Serial No. 631,117

10 Claims. (Cl. 91—56)

This invention relates to means for automatically maintaining the liquid contents of a vessel at a constant level, having reference more particularly to the composition tank or vat of a match making machine.

The invention, generally stated, consists in the combination with a suitable vessel, such as the composition vat of a match machine, of a rotatable liquid supply reservoir which is provided with an internal bucket or buckets operative to raise and discharge succeeding quantities of the liquid within the reservoir during the rotation of the latter, and a feed connection between said reservoir and vessel having an inlet member positioned to receive the liquid discharged within the reservoir in such manner that a progressive supply of liquid to the vessel is effected and a constant level of the liquid therein is maintained.

The invention also embodies features of novelty which will be hereinafter described; the scope of the invention being expressed in the appended claims.

In the drawings—

Figure 1 is a transverse vertical section of a match composition vat, and its appurtenances, equipped with a supply reservoir and a feed connection embodying my invention and including a rotatable ported shaft and a weighted feed cup independently rotatable thereon, said cup being shown in its upstanding or normal position in communication with the port in the shaft.

Fig. 2 is a vertical section in a plane through the reservoir and feed cup, as on the line 2—2 of Fig. 1.

Fig. 3 is a similar view, showing the cup in inverted position and sealing the port in the shaft.

Fig. 4 is a transverse vertical section through the inner hub portion of the reservoir, adjacent the feed cup, showing the cup controlling devices.

Fig. 5 is a perspective view of the weighted feed cup, detached.

Fig. 6 is a transverse vertical section of a portion of a composition vat equipped with a modified form of reservoir and feed connection therefrom to the vat.

Fig. 7 is a vertical section of the modified reservoir, as on the line 7—7 of Fig. 6.

Referring to the drawings, 10 designates a supporting frame having the usual steam jacket 11; and 12 designates a composition containing vat supported in the jacketed structure and removable endwise therefrom. This vat is equipped with a suitable transfer element, as the roll 13, whereby a suitable layer or film of the liquid composition is presented to the depending ends of travelling match splints, and also with the usual rotatable mixer 14 for agitating the composition beneath the roll. The respective shafts 15 and 16 of the roll and mixer are journaled in appropriate bearings 17 and 18 at the ends of the vat, the projecting extremities of the shafts at one end of the vat being squared, as at 19 and 20, and detachably seated in sockets in the hubs 21 and 22 of meshing gear wheels 23 and 24, respectively, which are included in the usual mechanism for continuously rotating the respective shafts.

According to my invention a rotatable supply reservoir 25 for liquid composition is arranged adjacent the end of the vat remote from the shaft actuating gearing and is interiorly connected with the vat by means of a conduit 26 to which the composition is intermittently supplied by the rotating reservoir and thence delivered to the vat in a manner to ensure a constant level of the composition contents of the latter.

In the construction shown in Figs. 1 to 5 inclusive, the reservoir 25 is mounted to rotate coaxially with the transfer roll 13 of the composition vat. This reservoir comprises a cylindrical body 27 having end heads 28 and 29, the head 28 having formed therein a central inlet 30 for the convenient introduction of composition into the reservoir; and the other head 29 being detachably secured to the body of the reservoir and having a central elongated hub 31 which is fixed on an extension 32 of the roll shaft to rotate therewith. The internal wall of the body 27 is provided intermediate its ends with a scoop or bucket 33 which in each rotation of the reservoir dips into the contained composition, which naturally reposes in the lower portion of the reservoir, and carries a supply of the composition to and discharges it at the top of the reservoir, vertically above the axis of rotation of the latter, or substantially so.

The shaft extension 32 projects into the reservoir beyond the inner end of the hub 31 and is provided with an axial bore or duct which extends from the projecting end of the extension to a point in the shaft within the vat, and has at its respective ends radial ingress and egress ports 34 and 35 in communication with the chambers of the reservoir and vat respectively.

Pivotally supported on the projecting ported end of the shaft extension 32, to have capacity for intermittent rotation thereon, is the bored base of a feed cup 36 having a bottom opening with which the ingress port 34 of the extension registers when the cup is in upstanding vertical position. When the cup is in that position its mouth receives the composition discharged from the overlying scoop or bucket 33 of the rotating reservoir, at or about which time the cup is in the same horizontal plane as the normal level of the composition contained in the vat, as seen in Figs. 1 and 2. In the present instance the feed cup is normally maintained in upstanding position by means of a weight integral therewith embodying a depending leg 37 having a foot 38 and a lateral projection 39. Extending radially from and rotatable with the hub 31, adjacent the weighted cup, are two pins 40 and 41, respectively, which during their rotation intersect the path of travel of the projection 39. These pins are so disposed in spaced relation that during a partial rotation of the reservoir clockwise, the leading pin 40 abuts against the opposing projection 39 and thereby bodily moves the pivotally mounted weighted cup to a position where the pin 40 is vertically disposed above the hub 31 of the reservoir, or substantially so, and the pin 41 is in a right oblique position below the hub, as seen in Fig. 3. The pin 40 in such travel inverts the cup to dump its contents into the reservoir, and carries the weight angularly beyond the center of gravity, as seen in Fig. 3, whereupon the weight, dropping, rapidly completes the rotation of the cup to position it in upstanding position, as seen in Fig. 2, where it dwells until the pin 40 in its travel again engages the projection and inverts the cup, and so on. When the cup is in inverted position it covers and seals the port 34 of the shaft extension 32, thus preventing the liquid from escaping from the composition vat, and when the cup is in upstanding position it is in communication with the port. The dwell of the upstanding cup at the end of each rotation thereof is sufficient to enable it to receive a supply of composition from the reservoir bucket.

The trailing pin 41 in each rotation of the reservoir serves as a stop or abutment for the projection 39 to limit the gravity swing of the weight, thus ensuring the upstanding vertical position of the cup until it is tilted by the action of the rotating pin on the projection 39.

From the foregoing described construction it will be seen that the reservoir containing in its lower portion a supply of liquid composition rotates concurrently with the transfer roll and the mixer of the composition vat; and that in each succeeding rotation of the reservoir the bucket 33 thereof is filled with composition and raised to a position where its contents is discharged into the upstanding feed cup 36, which composition flows thence through the conduit 26 into the vat in a manner to replenish the latter with a sufficient quantity of composition to ensure a constant level of the composition within the vat. It will also be seen that the feed cup is maintained in upright position a suitable period for the efficient reception and delivery of the composition and is then quickly inverted to dump the excess contents thereof into the reservoir and at the same time seal the port 34, thus obviating all liability of the setting or clogging of the composition in the cup or in the relatively small duct of the conduit leading therefrom to the vat and also preventing the escape of the liquid from the vat through the port while the cup is being rotated. Moreover, it will be seen that during the rotation of the reservoir the scoop or bucket 33 thereon and the rotating weighted feed cup 36 serve to stir and agitate the supply of composition within the reservoir.

In Figs. 6 and 7 of the drawings I have shown a modified form of the invention as applied to a match composition vat. In this construction the rotatable reservoir 25 comprises an inclined drum having a closed outer wall or head 280, a flanged mouth portion 300, and a series of spaced scoops or buckets 33 adjacent the flanged mouth portion. The head 280 has a central socket or hub 42 which is removably supported on an inclined pivot stud 43 projecting from a suitably disposed standard 44, and the flanged mouth portion is provided with internal gear teeth 45 in mesh with a gear 46 on the adjacent end of the mixer shaft 16 which extends from the composition vat 12. Hence during the rotation of the mixer 14 the reservoir is rotated concurrently therewith and with the transfer roll 13 in such manner that the buckets 33 in their rotary travel consecutively dip into a supply of liquid composition at the bottom of the reservoir and raise quantities of composition therefrom to the discharging position.

Extending from the end wall of the composition vat below the normal level of the composition therein and into the open mouth of the reservoir is a conduit 26 having an upwardly curved portion 261 terminating in a funnel 360 which is positioned directly beneath the uppermost part of the path of rotation of the buckets of the reservoir, so as to receive the descending composition discharged from the succeeding buckets, which composition thereupon flows through the conduit into the vat, and, since the open mouth of the funnel 360 is in the same horizontal plane as the normal level of the composition contained in the vat, it is obvious that the vat is efficiently supplied with composition during the operation of the apparatus and that the contents of the vat is maintained at a constant level defined by the top of the funnel.

It is to be understood that my invention is not limited to the particular exemplifying constructions herein disclosed, as the mechanism may be modified within the principle of the invention and the scope of the appended claims.

I claim—

1. The combination with a liquid-containing vessel, a transfer roll therein, a shaft for said roll, and means for rotating said shaft and roll, of a liquid supply reservoir rotatable with the shaft, said reservoir having on its inner wall means for raising succeeding quantities of the liquid contained in the reservoir and for discharging them at an upper level, and said shaft having a duct leading from the reservoir to the interior of the vessel, a feed cup for said duct rotatable on the shaft in operative relation to the inlet of the said duct within the reservoir, said cup so arranged that when it is in upright position the mouth thereof receives the discharged liquid and is in the same horizontal plane as the normal level of the liquid in the vessel, and in communication with the said inlet, and when said cup is in inverted position it seals the said inlet, and means for intermittently rotating said cup in timed relation to the travel of the reservoir and for effecting a prolonged dwell of the cup in upright position.

2. The combination with a liquid-containing vessel, a transfer roll therein, a shaft for said roll, and means for rotating said shaft and roll, of a liquid supply reservoir rotatable with the shaft, said reservoir having on its inner wall means for raising succeeding quantities of the liquid contained in the reservoir and for discharging them at an upper level, and said shaft having a duct leading from the reservoir to the interior of the vessel, a feed cup for said duct rotatable on the shaft in operative relation to the inlet of the said duct within the reservoir, said cup so arranged that when it is in upright position the mouth thereof receives the discharged liquid and is in the same horizontal plane as the normal level of the liquid in the vessel and in communication with the said inlet, and when said cup is in inverted position it seals the said inlet, and means for intermittently rotating said cup in timed relation to the travel of the reservoir, said last named means operative to effect a rapid movement of the cup to upright position, a prolonged dwell of the cup in that position, and a succeeding movement of the cup to inverted position.

3. The combination with a liquid-containing vessel, a transfer roll therein, a shaft for said roll, and means for rotating said shaft and roll, of a liquid supply reservoir rotatable with the shaft, said reservoir having on its inner wall means for raising succeeding quantities of the liquid contained in the reservoir and for discharging them at an upper level, and said shaft having a duct leading from the reservoir to the interior of the vessel, a feed cup for said duct rotatable on the shaft in operative relation to the inlet of the said duct within the reservoir, a depending weight on said cup to maintain the cup normally in an upright position in the path of the discharged liquid during the partial rotation of the reservoir, and in communication with the said inlet, and when said cup is in inverted position it seals the said inlet, and means rotatable with the reservoir for intermittently turning said weight and cup in timed relation to the travel of the reservoir.

4. The combination with a liquid-containing vessel, a transfer roll therein, a shaft for said roll, and means for rotating said shaft and roll, of a liquid supply reservoir rotatable with the shaft, said reservoir having on its inner wall means for raising succeeding quantities of the liquid in the reservoir and for discharging them at an upper level, and said shaft having a duct leading from the reservoir to the interior of the vessel, a feed cup for said duct rotatable on the shaft in operative relation to the inlet of the said duct within the reservoir, a depending weight on said cup to maintain the cup normally in an upright position in the path of the discharged liquid during the partial rotation of the reservoir, and in communication with the said inlet, and when said cup is in inverted position it seals the said inlet, and means for intermittently turning said weight and cup in timed relation to the travel of the reservoir, said last named means including a tappet member rotatable with the reservoir in co-operative relation to the weighted cup.

5. The combination with a liquid-containing vessel, a transfer roll therein, a shaft for said roll, and means for rotating said shaft and roll, of a liquid supply reservoir rotatable with the shaft, said reservoir having on its inner wall means for raising succeeding quantities of the liquid contained in the reservoir and for discharging them at an upper level, and said shaft having a duct leading from the reservoir to the interior of the vessel, a feed cup for said duct rotatable on the shaft in operative relation to the inlet of the said duct within the reservoir, a depending weight on said cup to maintain the cup normally in an upright position in the path of the discharged liquid during the partial rotation of the reservoir, and in communication with the said inlet, and when said cup is in inverted position it seals the said inlet, and means rotatable with the reservoir for intermittently turning said weight and cup in timed relation to the travel of the reservoir, said last named means including spaced tappet and stop members in co-operative relation to the weighted cup.

6. In combination with a liquid-containing vessel, a liquid supply reservoir having means on the inner wall thereof for raising succeeding quantities of liquid contained in the reservoir and for discharging them at an upper level, a rotatable shaft for said reservoir having a duct leading from the reservoir to the interior of the vessel, a feed cup for said duct rotatable on said shaft in operative relation to the inlet of the duct within the reservoir, said cup so arranged that when it is in upright position the mouth thereof receives the discharged liquid and is in the same horizontal plane as the normal level of the liquid in the vessel, and in communication with the said inlet, and when said cup is in inverted position it seals the said inlet, and means for intermittently rotating said cup in timed relation to the travel of the reservoir and operative to effect a prolonged dwell of the cup in upright position.

7. In combination with a liquid-containing vessel, a liquid supply reservoir having means on the inner wall thereof for raising succeeding quantities of liquid contained in the reservoir and for discharging them at an upper level, a rotatable shaft for said reservoir having a duct leading from the reservoir to the interior of the vessel, a feed cup for said duct rotatable on said shaft in operative relation to the inlet of the duct within the reservoir, said cup so arranged that when it is in upright position the mouth thereof receives the discharged liquid and is in the same horizontal plane as the normal level of the liquid in the vessel, and in communication with the said inlet, and when said cup is in inverted position it seals the said inlet, and means for intermittently rotating said cup in timed relation to the travel of the reservoir and operative to effect a prolonged dwell of the cup in upright position and then a rapid movement of the cup to inverted position.

8. The combination with a liquid-containing vessel, a transfer roll therein, a mixer below the roll, and means for rotating said roll and mixer, of a reservoir having an open mouth adjacent the vessel, said reservoir also having liquid lifting buckets on the inner wall of the reservoir, means for rotating said reservoir concurrently with the roll and mixer, and a conduit extending through the mouth of the reservoir from a point below the normal level of the liquid within the vessel, and having within the reservoir an upturned receiving portion for the liquid discharged from the progressing buckets in the upper portion of the reservoir, the mouth of said receiving portion being in the same horizontal plane as the normal level of the liquid in the said vessel.

9. The combination with a liquid containing vessel, of a liquid supply reservoir therefor, means for rotating said reservoir to raise and discharge quantities of the contained liquid, a conduit affording communication between said reservoir and vessel and having an inlet member located within the reservoir to receive the discharged liquid and maintain a constant level of the liquid contents of the vessel, said inlet member comprising a rotatable feed cup which when in upright position receives the discharged liquid and is in the same horizontal plane as the normal level of the liquid in the vessel and in communication with the conduit, and when said cup is in inverted position it seals the entry to the said conduit, and means for intermittently rotating said inlet member in timed relation to the travel of the reservoir and for effecting a prolonged dwell of the cup in upright position.

10. The combination with a liquid containing vessel, of a liquid supply reservoir therefor, means for rotating said reservoir to raise and discharge quantities of the contained liquid, a conduit affording communication between said reservoir and vessel and having an inlet member located within the reservoir to receive the discharged liquid and maintain a constant level of the liquid contents of the vessel, said inlet member comprising a rotatable feed cup the mouth of which when the cup is in upright position receives the discharged liquid and is in the same horizontal plane as the normal level of the liquid in the vessel and in communication with the conduit, and means for intermittently rotating said cup in timed relation to the travel of the reservoir, said last named means operative to effect a rapid movement of the cup to upright position, a prolonged dwell of the cup in that position, and a succeeding movement of the cup to inverted position.

MICHAEL PARIDON.